United States Patent [19]

Barkan

[11] Patent Number: 5,828,050
[45] Date of Patent: Oct. 27, 1998

[54] LIGHT EMITTING LASER DIODE SCANNER

[75] Inventor: Edward Barkan, South Setauket, N.Y.

[73] Assignee: Symbol Technologies, Inc., Holtsville, N.Y.

[21] Appl. No.: 961,985

[22] Filed: Oct. 31, 1997

Related U.S. Application Data

[60] Continuation of Ser. No. 424,664, Apr. 18, 1995, abandoned, which is a division of Ser. No. 56,878, May 5, 1993, Pat. No. 5,410,140, which is a continuation of Ser. No. 47,340, Apr. 19, 1993, Pat. No. 5,268,564, which is a continuation of Ser. No. 772,745, Oct. 7, 1991, abandoned, which is a continuation of Ser. No. 562,130, Aug. 3, 1990, Pat. No. 5,151,580.

[51] Int. Cl.$^6$ ....................................................... G06K 7/10
[52] U.S. Cl. ........................................... 235/462; 235/463
[58] Field of Search ................................... 235/472, 462, 235/467, 454, 463

[56] References Cited

U.S. PATENT DOCUMENTS

| | | |
|---|---|---|
| 4,251,798 | 2/1981 | Swartz et al. .......................... 235/462 |
| 4,360,798 | 11/1982 | Swartz et al. . |
| 4,387,297 | 6/1983 | Swartz et al. . |
| 4,409,470 | 10/1983 | Shepard et al. . |
| 4,462,009 | 7/1984 | Landt et al. ........................... 333/17.1 |
| 4,806,742 | 2/1989 | Swartz et al. . |
| 4,816,660 | 3/1989 | Swartz et al. . |
| 4,825,057 | 4/1989 | Swartz et al. ........................... 235/472 |
| 5,061,843 | 10/1991 | Sato et al. ............................. 235/462 |

*Primary Examiner*—Anita Pellman Gross
*Assistant Examiner*—Karl Frech
*Attorney, Agent, or Firm*—Finnegan, Henderson, Farabow, Garrett & Dunner, L.L.P.

[57] ABSTRACT

A portable scanning head emits and receives light from a light-emitting diode to read symbols, such as bar-code symbols. The optics within the scanner are operative for focusing a light beam and the view of a light sensor in different planes exteriorly of a scanner housing. Imaging means are provided in the unit for imaging a viewing window. The viewing window has an area smaller than that of the scan spot. The system can employ an LED as a light source and tolerate the relatively large-sized (on the order of millimeters) scan spot without sacrificing reading performance since the photodiode "sees" only that portion of the scan spot visible through the viewing window.

37 Claims, 5 Drawing Sheets

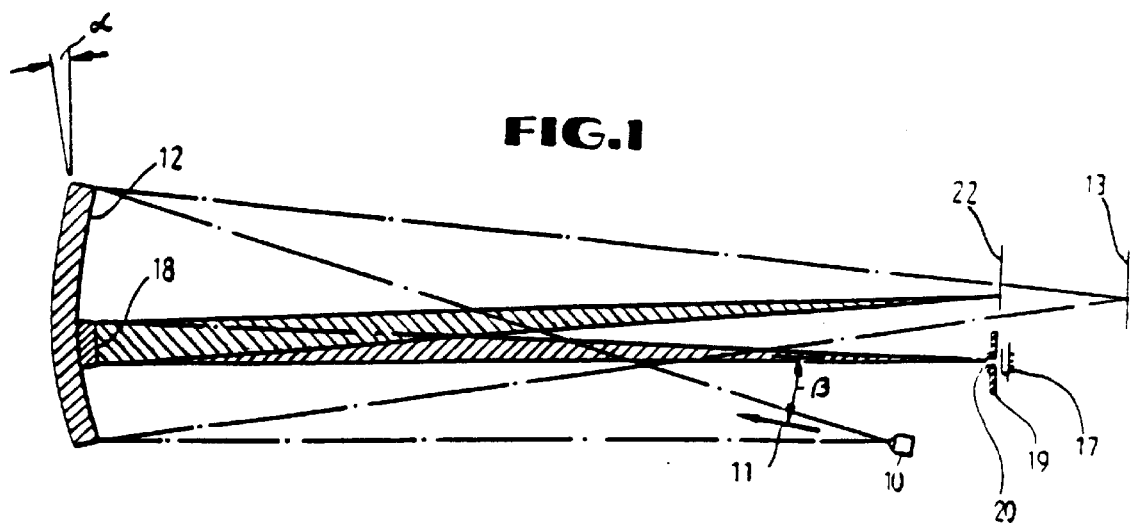
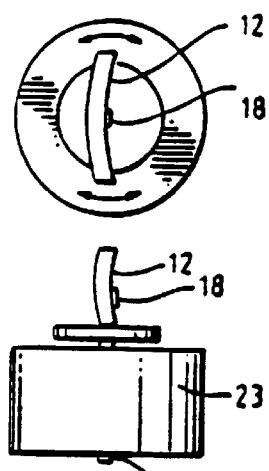
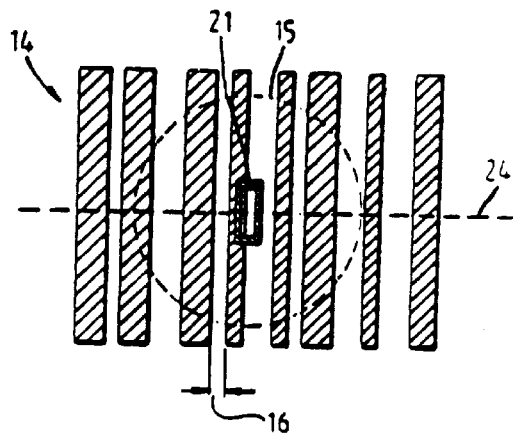
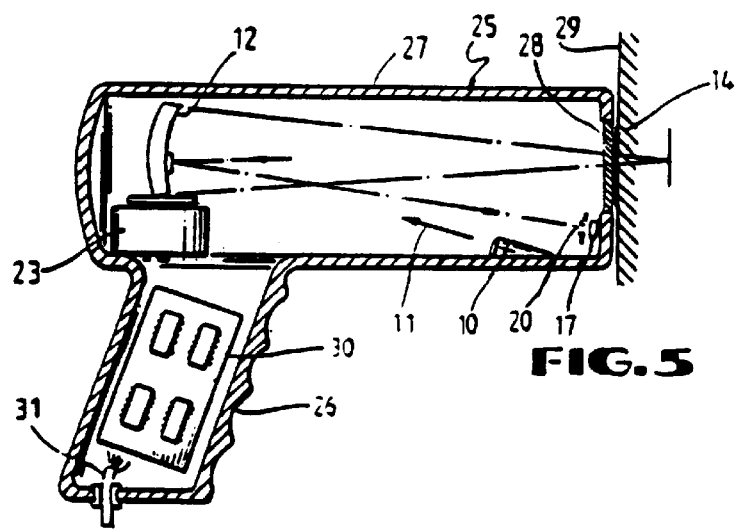

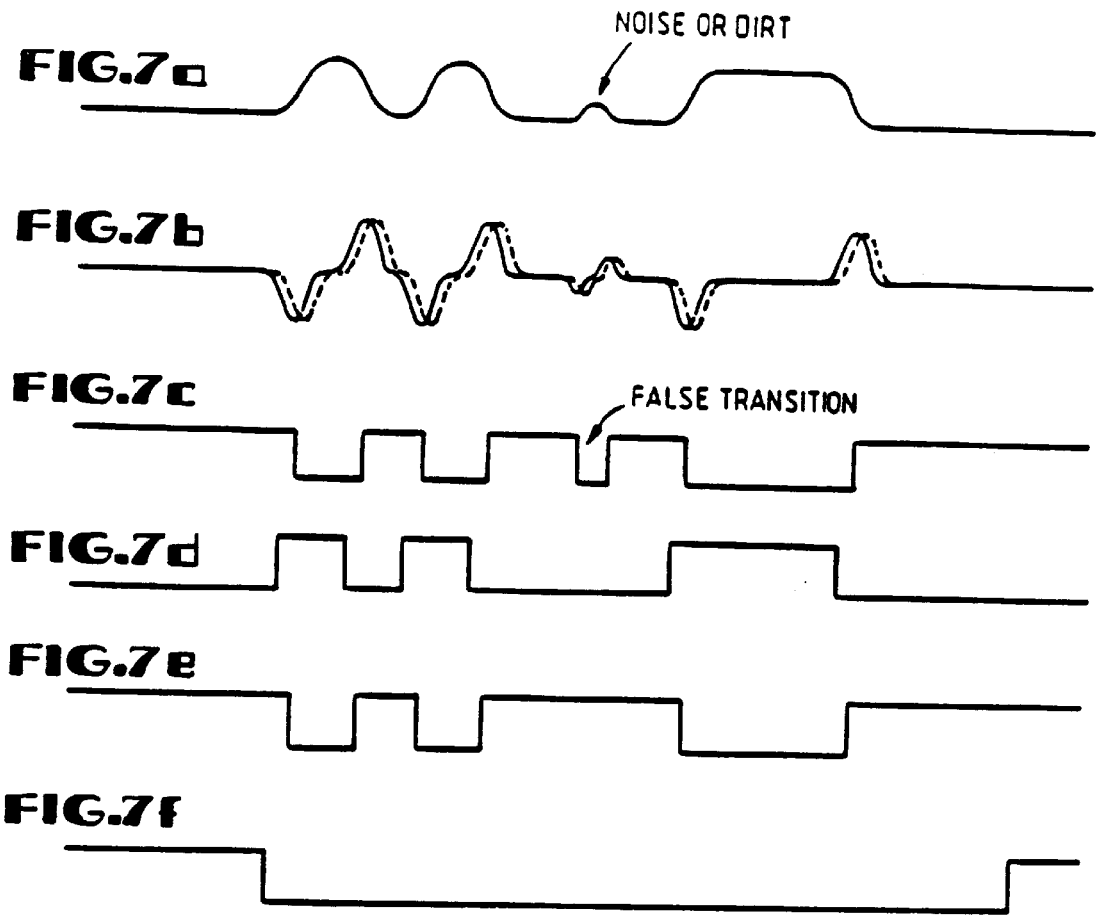
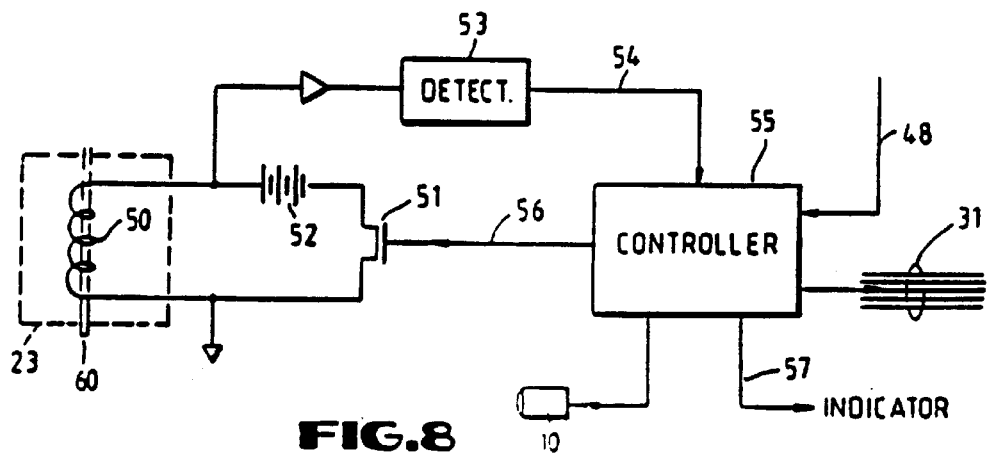

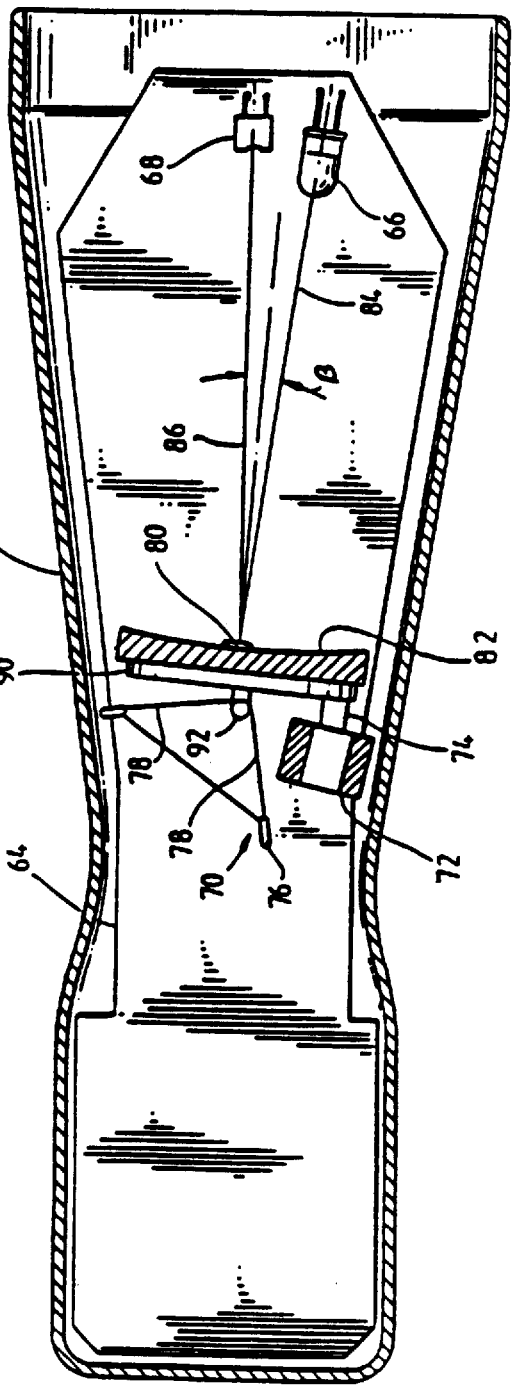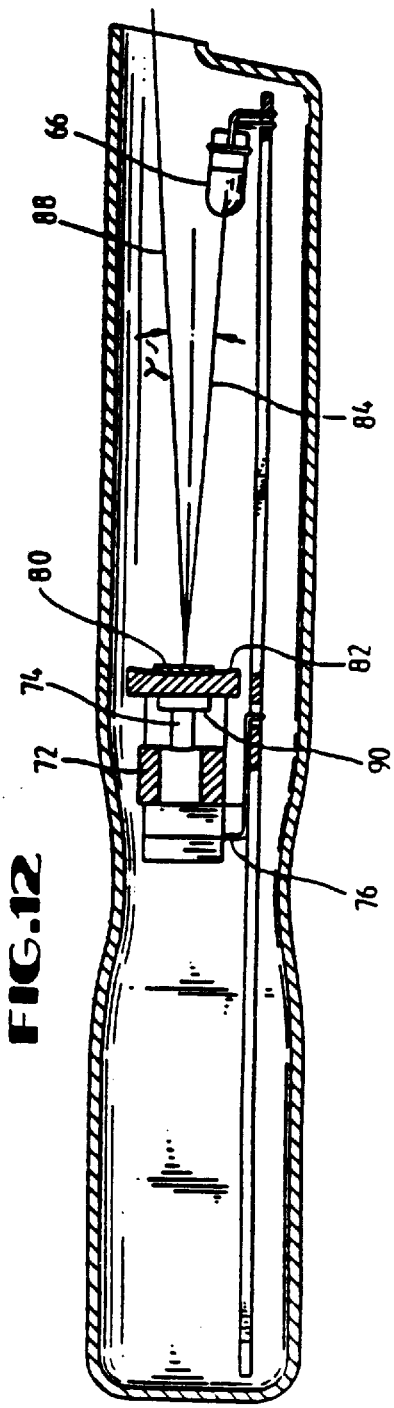

LIGHT EMITTING LASER DIODE SCANNER

REFERENCE TO RELATED APPLICATIONS

This application is a continuation of application Ser. No. 08/424,664 filed Apr. 18, 1995 now abandoned, which is a divisional of U.S. patent application Ser. No. 08/056,878, filed May 5, 1993, now U.S. Pat. No. 5,410,140, which is a continuation of U.S. patent application Ser. No. 08/047,340, filed Apr. 19, 1993, now U.S. Pat. No. 5,268,564, which is a continuation of U.S. patent application Ser. No. 07/772,745, filed Oct. 7, 1991 now abandoned, which is a continuation of U.S. patent application Ser. No. 07/562,130, filed Aug. 3, 1990, which issued into U.S. Pat. No. 5,151,580 on Sep. 29, 1992.

This application is also related to co-pending U.S. patent application Ser. No. 08/482,556, filed Jun. 7, 1995 entitled "System for reading Data on Different Planes of Focus based on Reflected Light", and co-pending Ser. No. 08/425,808, filed Apr. 20, 1995 entitled "False-Transition Inhibitor Circuit for a Bar Code Reader", which are also divisionals of Ser. No. 08/055,878, filed May 5, 1993, noted above.

BACKGROUND OF THE INVENTION

This invention generally relates to an electro-optical scanning system for reading symbols, especially bar code symbols and, more particularly, to non-laser-based scanners operative for focusing a light beam and the view of a light sensor in different planes exteriorly of a scanner housing.

It has heretofore been proposed to read bar code symbols, particularly of the Universal Product Code (UPC) type, by using laser and non-laser scanners of the type disclosed in, for example, U.S. Pat. Nos. 4,251,798; 4,387,297; 4,409,470; 4,806,742 and 4,825,057, all of which have been assigned to Symbol Technologies, Inc., the assignee of this invention, and are hereby incorporated by reference herein.

Typically, a laser beam generated by a laser source, for example, a gas laser tube or a semiconductor laser diode, is optically focused by an optical train into a generally circular laser beam spot on a symbol. The beam spot is swept by a scanning component over the symbol and forms a scan pattern thereon. Laser light reflected off the symbol is detected by a light sensor, e.g. a photodiode, mounted together with the laser source, the optical train, the scanning component, and the photodiode in a housing, preferably one having a handle to enable hand-held, portable operation.

The symbol itself is a coded pattern comprised of a series of bars of various widths, the bars being spaced apart from one another to bound spaces of various widths, the bars and spaces having different light-reflective properties. Although dimensions may vary, depending on the particular application and the density of the symbol, each bar and space of a UPC symbol typically used in the retail industry to identify retail products measures on the order of thousandths of an inch (mils). In practice, the generally circular laser beam spot has a cross-sectional diameter on the order of 6 to 10 mils.

Although the known laser scanners have enjoyed considerable commercial success, there is nevertheless incentive to reduce the cost of the scanner unit. The laser devices produce a very intense light spot of small size, and thus have inherent advantages. However, the laser light sources are of relatively high cost compared, for example, to non-laser sources such as light emitting diodes (LEDs). The use of non-laser sources presents problems, since it is difficult to focus a non-collimated LED source to beam spot sizes measuring on the order of mils, at least not without resorting to expensive, heavy, multiple-element optical trains or loss of power. LEDs can typically be focused to spot sizes on the order of millimeters. However, using such a large-sized beam spot to read bars and spaces which measure on the order of mils imposes a significant burden on the signal processing and decode circuitry for the scanner. Non-reads and reading errors are likely.

By contrast, in laser-based systems, where the laser beam spot dimensions are on the same order of magnitude as those of the bars and spaces to be decoded, the signal processing and decoding circuitry has no such burden. The photodiode in such laser-based systems typically "looks" at a large volume of space surrounding the beam spot and in a common plane therewith.

SUMMARY OF THE INVENTION

It is a principal object of this invention to provide improved electro-optical scanners. Another object is to provide improvements in practicality, reliability, freedom from errors, and/or cost reduction in low-cost, non-laser-based scanners. An additional object is to provide a method of focusing a light beam into a scan spot, and to focus the view of a photodiode into a viewing window which is sized to lie within the scan spot. A further object is to provide a method of positioning the scan spot and the viewing window in different planes exteriorly of a housing for the scanner. In addition, an object is to provide a scanner device which is of low cost and high reliability, and is simple and convenient to operate by unskilled users. Further, an object is to provide an improved scanner that automatically adapts to varying scanning conditions without operator intervention.

According to one embodiment of the invention, in keeping with these objects, and others which will become apparent hereinafter, one feature resides, briefly stated, in a system for, and a method of, reading symbols using an LED type of light source. The system includes a light source means, e.g. an LED, for generating a non-laser light beam. Focusing means are provided in the unit for focusing the light beam to a scan spot of predetermined area at a scan plane that is located exteriorly of the unit. The scan spot is positioned on a symbol located in a working distance range in the vicinity of the scan plane.

The system further includes scanning means, e.g. a motor-driven mirror, for sweeping the scan spot across the symbol in a scan. Thus, light is reflected off the symbol in all directions. At least a returning portion of the reflected light travels away from the symbol back toward the unit. This returning portion has a variable intensity over the scan.

Sensor means, e.g. a photodiode, in the unit is operative for viewing and detecting the variable intensity of the returning portion of the reflected light over a field of view. The photodiode generates an electrical signal indicative of the detected variable light intensity. Signal processing means processes the electrical signal and generates therefrom data descriptive of the symbol.

In accordance with one feature of this invention, imaging means are provided in the unit for imaging a viewing window. The viewing window has an area smaller than that of the scan spot. The viewing window is positioned at a viewing plane that is spaced away from the scan plane. Thus, the system can employ an LED as a light source and tolerate the relatively large-sized (on the order of millimeters) scan spot without sacrificing reading performance since the photodiode "sees" only that portion of the scan spot visible through the viewing window. The viewing window is configured to have dimensions on the order of mils, so the photodiode "sees" only a very small central portion of the scan spot. Hence, the photodiode no longer "sees" a broad volume of space surrounding the scan spot, but, instead, "looks" at a very small volume of space within the scan spot.

In a preferred embodiment, the focusing means includes a focusing mirror operative to optically form the scan spot to have a generally circular area. Preferably, the focusing mirror has a generally spherical reflecting surface.

Also, the imaging means includes an apertured wall having an aperture adjacent a sensor opening of the photodiode or a very small photodiode. Reflected light passes through the aperture en route to the photodiode. That is, the aperture defines the sensitive area of the sensor.

The imaging means further includes an imaging mirror, preferably having a generally spherical reflecting surface. Advantageously, both the focusing mirror and the imaging mirror are mounted in the unit for joint movement by the scanning means longitudinally across the symbol. The scanning means includes a reciprocatingly oscillatable scanning component on which both mirrors are mounted for joint movement about an axis.

The imaging mirror is mounted on the focusing mirror, and is also angularly offset relative to the axis. In a preferred case, wherein the light beam is directed along a first optical axis, and wherein the viewing window of the sensor means is imaged by the imaging means along a second optical axis, the angle included between said optical axes is twice the angular offset between the imaging and focusing mirrors.

The housing may have a handle to enable hand-held operation. The hand-held housing or head is aimable by a user at the symbol to be read which is in contact with or at a longitudinal distance from a front wall of the head. This device is optimized for contact use: here the optical path is almost entirely within the housing. In one embodiment, the scan plane and the viewing plane are offset relative to one another, near or at the front wall of the housing.

In another embodiment, the sensor means may include a pair of photodiodes for increased zone coverage, each photodiode having a sensor opening. In this case, the imaging means includes a pair of apertured walls, each having an aperture situated adjacent to, or constituting, a respective sensor opening. The imaging means is operative, in this case, for imaging each viewing window of the respective photodiodes to a pair of viewing windows positioned in different viewing planes exteriorly of the housing. In a preferred application, the "closer-in" viewing plane may be used in the decoding of high-density symbols, whereas, the "further-out" viewing plane may be used in the decoding of low-density symbols.

According to a feature of another embodiment, the characteristics of the bar code symbols being read are detected, with respect to being high-density or low-density bar code symbols, and the signal processing circuitry is altered in bandwidth in response to this detection. In this manner, the bandwidth best suited for reading each type of bar code is utilized by the processing circuitry. A wide bandwidth will allow more noise to propagate through the processing circuitry, and so the bandwidth is narrowed to use only that which is needed. Low density bar code do not require as much bandwidth in the signal processing circuitry as high-density bar codes.

In order to lower the cost of the bar code reader device, mechanical and electrical parts are eliminated whenever possible. In one embodiment, the trigger switch ordinarily used in a hand-held scanner is eliminated by using another technique for turning the unit on when the user is ready to read a bar code. A motion sensor detects when the user picks up the hand-held unit, and turns on the light source and scanner motor in response to this detection. The motor and light source can then be turned off by a time-out circuit, or in response to decoding a valid bar code.

BRIEF DESCRIPTION OF THE DRAWINGS

The novel features which are considered as characteristic of the invention are set forth in the appended claims. The invention itself, however, both as to its construction and its method of operation, together with additional objects and advantages thereof, will be best understood from the following description of specific embodiments when read in connection with the accompanying drawings, wherein:

FIG. 1 is an elevation view in diagrammatic form of one embodiment of a non-laser-based system for reading bar code symbols according to this invention;

FIG. 2 is an enlarged view of a viewing window superimposed on a scan spot that, in turn, is superimposed over a bar code symbol to be read by the system of FIG. 1;

FIG. 3 is an elevation view of a scan motor and mirror assembly used in the scanner of FIG. 1;

FIG. 4 is a top view of the scan motor and mirror assembly of FIG. 3;

FIG. 5 is an elevation view of a hand-held scanner unit constructed according to the embodiment of FIGS. 1, 3 and 4;

FIGS. 7a to 7f are timing diagrams of voltages appearing in the circuit of FIG. 6;

FIG. 8 is an electrical circuit diagram in schematic form of a movement detector circuit used in the system of FIGS. 1–5 according to a feature of an alternative embodiment of the invention;

FIG. 11 is a top view of a currently preferred commercial embodiment of the scanner head in accordance with this invention;

FIG. 12 is a side view of a currently preferred commercial embodiment of the scanner head in accordance with this invention.

DETAILED DESCRIPTION OF SPECIFIC EMBODIMENTS

Figure 6:
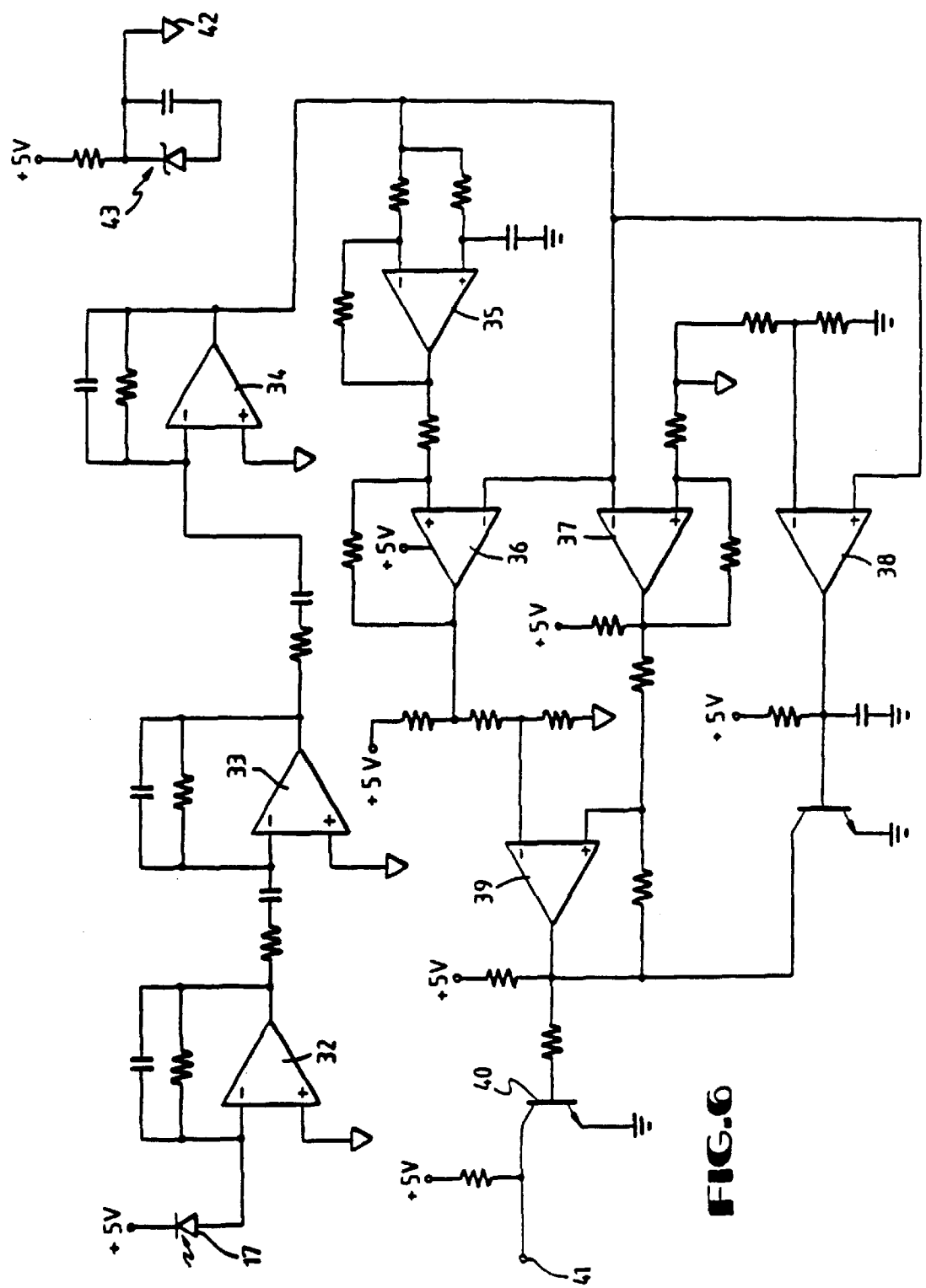
FIG. 6 is an electrical circuit diagram in schematic form of a digitizer circuit used in the system of FIGS. 1–5 according to one embodiment of the invention.

Referring now to FIG. 1 of the drawings, a system for reading symbols is illustrated. The term "symbol" as used herein is intended to cover indicia composed of portions having different light-reflective properties. The indicia may, in a preferred case, be the omnipresent UPC bar code symbol, or other codes such as Code 39, Codeabar, Interleaved 2 of 5, or other characters.

The system of FIG. 1 includes a non-laser type of light source 10, such as an LED or semiconductor light emitting diode. The source 10 produces a non-coherent, non-collimated, wide-angle light beam 11 which is focused by a curved mirror 12 onto a plane 13. The bar code symbol 14 to be read is shown in FIG. 2, and it is noted that a spot 15 of light produced by the focused beam 11 is much larger than the minimum dimension 16 of the bars or spaces of the symbol 14 in the viewing plane. A light sensor 17 such as a photodiode is included in the system of FIG. 1, and the light reflected from the symbol 14 due to light beam 11 is focused by a smaller curved mirror 18 onto the detecting surface of this sensor. An apertured wall 19 blocks reflected light from reaching the sensor 17 except that passing through a slit 20. This slit is preferably of an elliptical shape, perhaps 6×16 mils in size, to define a field view or viewing window 21 for the sensor as seen in FIG. 2. The viewing window 21 of the sensor 17 is focused by the mirror 18 to be in a plane 22, which is axially spaced from the focal plane 13 produced by the mirror 12 for the light beam 11. The symbol 14 to be read is located in the plane 22, so the image of the slit 20 in the plane 22 forms the viewing window 21 on the symbol. The focal lengths of the two mirrors 12 and 18 are the same in an example embodiment, so the spacing between plane 13 and plane 22 is due to the difference in spacing of the light source 10 and the sensor 17 from the mirrors.

The mirrors 12 and 18 are driven by a motor 23 as seen in FIGS. 3 and 4 so that the spot 15 and the viewing window 21 move in the plane 22 across the symbol 14 in a scan line 24 as seen in FIG. 2. The smaller mirror 18 is mounted on the larger mirror 12 and is angularly displaced in a manner such that a central axis of the mirror 18 is displaced by an angle α with respect to a central axis of the mirror 12. The light source 10 is on an axis with respect to the mirror 12 which is angularly displaced, by an angle β, with respect to an axis on which the sensor 17 resides. The angle α is one-half that of angle β.

The scanned spot 15 resulting from the light beam 11 is much larger than the viewing window 21 of the sensor 17, so only a very small part of the illumination by the light beam is sensed; of course, only a small part of the reflected light reaches the photodetector. In addition, an LED generally produces a light beam of lower intensity compared to a laser source. Thus, it is important that the mirror 12 be large so that more of the LED light is focused onto the scan plane and the light density in the spot 15 is reasonably high. Note that the construction of a typical laser scanner is reversed from that of FIGS. 1 and 2; in a laser scanner a bright, sharply-focused laser beam produces a spot of about the size of the minimum dimension 16 of the bar code pattern, then the photodetector employed has a field of view much larger than the laser beam spot. In contrast, here the spot 15 produced by the light beam is large, and the viewing window 21 is small.

Referring to FIG. 5, in one embodiment, the scanning system of FIGS. 1–3 is mounted in a hand-held, gun-shaped housing 25 which has a handle 26 and a barrel portion 27. The system is, in this embodiment, a "contact" type of bar code scanner, in that the package containing the bar code symbol 14 is directly in front of the front or snout end of the housing when the reading operation takes place. A window or opening 28 in the front end of the barrel portion 27 of the housing 25 is transparent to the light beam 11 and the reflected LED light going back to the sensor 17, and this window 28 is placed in contact, or very close to, the surface 29 of the package having the bar code symbol 14 thereon. An actual window element may be omitted (i.e., it may be just a hole formed in the housing), or the window 28 may be spaced a distance such as ½ inch inside the front end of the housing; this spacing protects the window from scratching.

The plane 22 of the image of the slit 20 is seen to be almost in the same plane as that of the light sensor 17, as the sensor is near the front of the barrel 27, vertically displaced from the window 28. The mirrors 12 and 18 and the drive motor 23 are mounted in the back end of the barrel 27. The circuitry used to process the electrical signal produced by the sensor, and other control circuitry needed in the unit, is mounted on circuit boards 30 in the handle 26. The unit of FIG. 5 is connected to a terminal or base station by a cable 31 containing conductors for carrying the processed bar code data, as well as voltage supplies for the light source 10 and motor 23. Alternatively, an RF link may be used to send the signals back to a base station, in which case a battery is included within the housing 25, e.g., in the handle. In either event, a compact, light-weight, hand-held unit is thus provided.

FIG. 6 depicts a preferred digitizer; i.e., a circuit to obtain a digital signal representing a bar code from the analog signal developed by the light sensor or photodetector 17. The sensor 17 is connected to circuitry for processing the electrical signals produced as a result of the bar code scan. FIGS. 7a to 7f depict the signals appearing at various points in the circuit of FIG. 6.

FIG. 7a depicts the original analog signal that the sensor 17 feeds to a current-to-voltage converter 32. The converter 32 feeds the developed voltage to a differentiator 33. The differentiator 33 develops the first-derivative of the converted analog signal. The differentiator 33 sends this first-derivative signal to an amplifier 34 which amplifies and filters the first-derivative signal. The solid line FIG. 7b depicts this amplified and filtered (and inverted) first-derivative signal. This signal is inverted since each of the converter 32, the differentiator 33, and the amplifier 34 receives its input signal at its inverting input.

The amplified and filtered first-derivative signal is fed to four elements: a delay element 35, a peak-locating comparator 36, a false-transition gating comparator 37, and a margin-threshold circuit 38. The dotted line in FIG. 7b depicts the delayed first-derivative signal. The amplified first-derivative signal and the delayed first-derivative signal feed the inverting and non-inverting inputs of the peak-locating comparator, respectively. As shown in FIG. 7b, there are points in time where these signals cross; i.e., they are equal. At these crossing points, the output of the peak-locating comparator changes state. FIG. 7c depicts the output of the peak-locating comparator 36. The peak-locating comparator 36 feeds this output signal to a latch comparator 39.

The false-transition gating comparator 37 also receives the amplified first-derivative signal at its inverting input. A feed-back signal is connected to the non-inverting input of the comparator 37. FIG. 7d depicts the output of the comparator 37. If the false-transition gating comparator has changed state since the last change of state of the peak-locating comparator, the latch comparator will change state. In other words, the latch comparator only changes state upon the first transition of the peak-locating comparator following a transition of the gating comparator. In this way, noise that might cause spurious transitions on the output of the peak-locating comparator do not cause false transitions on the latch comparator output unless the noise is big enough to trip the false-transition gating comparator.

The output of the latch comparator 39, is fed through a transistor 40 to an output 41. FIG. 7e depicts the signal at the output 41. Also, for each point in the circuit requiring an analog ground 42, this ground is developed by an auxiliary circuit 43.

The level at which the gating comparator trips is determined by the amount of hysteresis resulting from the positive feedback provided. This level is set to be slightly lower than the smallest genuine signal peaks that are expected, but higher than the typical noise levels. The peak-locator comparator, on the other hand, is provided with minimal hysteresis so as to insure maximum digitizing accuracy.

The margin threshold, set by the margin threshold circuit 38, is set to be a fixed D.C. voltage below zero. The margin threshold circuit 38 acts like a retriggerable one shot multivibrator that will not time out as long as there is a continuous series of pulses that exceed the threshold. When the pulses stop long enough for it to time out, the digitized bar output is forced back to the white (space) state. FIG. 7f depicts the output of the margin threshold circuit 38. This margin threshold circuit 38 provides increased noise immunity in the margin, i.e. the region beyond the extremes of the bar code.

Referring to FIG. 8, a technique for turning the scan motor 23 on and off is disclosed. Usually, a trigger switch is employed so that the user can manually initiate the scan operation by squeezing the trigger on the handle of a hand-held scanner unit when the user is ready to read a bar code symbol. In the interest of reducing the parts count and assembly time, and thus lowering cost and increasing reliability, the mechanical trigger switch is eliminated by turning the unit on in response to the unit being picked up by the operator. A motion or acceleration detecting mechanism is thus employed, so whenever the unit is laid down on the counter by the user, the scan motor 23 and the LED light source 10 are turned off (as by a time out arrangement), but when the unit is picked up the motion is detected and used to initiate operation of the scanner.

To this end, the coil 50 of the motor 23 is connected through a switch 51 in series with the power supply 52, so the motor 23 is energized only when the FET switch 51 is turned on. The voltage across the coil 50 is detected by a detector 53, however, so that when the motor coil is not energized, any movement of the motor shaft can be sensed due to a small voltage generated in the coil by movement of the rotor past the coils. The mirrors 12 and 18 are pivoted to rotate freely with the motor shaft, and any slight movement when the motor coil 50 is not energized will cause the mirrors to move. The output 54 from the detector 53 is applied to a controller 55, and an output 56 from the controller 55 is applied to the gate of the FET switch 51 to turn on or turn off the motor. The controller 55 may be an Intel 8031 type of microcontroller, for example, and may be the controller used to evaluate the digitized bar code signals from output 41 in FIG. 6. In addition, an output 57 from the controller 55 is employed to activate the LED light source 10. An indicator light 58 (or beeper) may also be activated by the controller 55 when a valid bar code is decoded, demonstrating to the user that the task is completed. The controller 55 may also contain timing registers used to count down various time-out periods; for example, the motor and light source may be automatically cut off after a given period since the turn-on initiated by the detector 53, or after a valid bar code has been recognized. If the unit is turned off by time-out when the user still has the housing 25 in his hand and is going to read other bar codes, then it will be turned on again due to the movement to orient it toward the next bar code symbol.

Instead of the contact type of scanner seen in FIG. 5, the unit may be of the type held several inches or more away from the symbol to be read, as found, for example, by reference to U.S. Pat. Nos. 4,387,297; 4,409,470 and 4,816, 660, the entire contents of which are hereby incorporated by reference herein. The housing 25 can also be incorporated in a stand-alone workstation mounted on a countertop or similar support surface for use in either a scan-above, scan-below or scan-sideways system. The head can be incorporated in a fixed or adjustable mount installation.

The scanning mechanism including the pivoted mirrors 12 and 18 mounted on the shaft 60 of the motor 23 is operative for sweeping the scan spot 15 across the symbol 14 in a scan, and is preferably a high-speed scanner motor of the type shown and described in U.S. Pat. No. 4,387,397, the entire contents of said patent being incorporated herein by reference and made part of the instant application. For purposes of this application, it is believed to be sufficient to point out that the scanner motor 23 has an output shaft 60 on which the focusing mirror 12 is fixedly mounted. The motor 23 is driven to reciprocatingly and repetitively oscillate the shaft and mirror in alternate circumferential directions about the axis of the shaft 60 over arc lengths of any desired size, typically much less than 360° (The embodiment of FIGS. 1 and 5 uses an angle of about 32°), and at a rate of speed on the order of a plurality of oscillations per second. In a preferred embodiment, the focusing mirror 12 and the shaft 60 are oscillated jointly so that the scan spot 15 is repetitively swept in a linear scan 24 across the symbol 14 lengthwise thereof through an angular distance or arc length at the scan plane 22 of about 32° and at a rate of about twenty scans to forty oscillations per second.

Although this invention is being described in connection with a single linear scan 24 extending across a symbol 14, it is not intended for the invention to be so limited, since various other types of scan pattern may be formed over the symbol to be read. The scan pattern, for example, can be a set of mutually parallel linear scan lines, as set forth in copending application Ser. No. 317,533, filed Mar. 1, 1989, or in U.S. Pat. Nos. 4,369,361 or 4,387,297.

As previously mentioned, each of the bars and spaces of the symbol 14 of the density commonly found in the retail industry for identifying retail merchandise measures on the order of a few mils. The scan spot 15, which is focused by the focusing mirror 12, measures on the order of several millimeters and, hence, would lead to decoding errors, since the scan spot 15 is much too large to reliably detect the leading and trailing edges of each bar of the symbol. In laser-based scanners, the cross-section of the scan spot at the symbol generally measures from 6 - to 10 -mils, and this size is generally regarded as being optimal for minimizing decoding and reading errors without resorting to complex, highly sophisticated, signal processing circuitry or excess power loss.

Hence, in accordance with this invention, imaging means are provided in the housing 25 for imaging a viewing window 21 of the photodiode 17, the viewing window 21 having an area smaller than that of, and located entirely within, the scan spot 15. The imaging means advantageously includes an imaging mirror 18, and an apertured wall 19 having an aperture or slit 20 formed therethrough. The imaging mirror 18 is advantageously mounted on the focusing mirror 12 for joint movement therewith by the scanner motor 23 about the axis or the shaft 60. The imaging mirror 18 is angularly offset from the axis of the mirror 12 at an angle a. The slit 20 is located immediately adjacent a sensor opening of the photodiode 17. The sensor opening can itself serve as the slit 20. Alternatively, the photodiode 17 may advantageously be a very small photodetector. Such a small photodetector reduces noise, lowers cost of the scanner, and diminishes sensitivity to soiled optics. The slit 20, in a preferred embodiment, is formed with a generally rectangular or elliptical cross-section whose shorter dimension, e.g. 6-mils, is located along the scan direction, and whose longer dimension, e.g. 16-mils, is located transversely of the scan direction. The rectangular slit 20, together with the imaging mirror 18, form the viewing window 21 with a similar rectangular shape, as best shown in FIG. 2. If the slit 20 is the preferable elliptical shape, then the viewing window 21 will have a similar elliptical shape.

The imaging mirror 18, which also has a generally spherical reflecting surface, positions the viewing window 21 at a viewing plane 22 that is located exteriorly of the housing 25. The viewing plane 22 is longitudinally spaced away from the scan plane 13. Both the focusing and imaging mirrors 12 and 18, preferably, but not necessarily, have the same focal length. The slit 20 is imaged at the viewing plane 22 with a magnification close to one, thereby resulting in an image size of the slit of about 6 by-16 mils (the size of the viewing window 21). A first optical axis is concentric with the light beam 11 between the LED 10 and the focusing mirror 12, and a second optical axis is concentric with the returning light beam between the imaging mirror 18 and the photodiode 17. The angle $\beta$ included between these first and second optical axes is on the order of twice the angular offset $\alpha$ between the imaging and focusing mirrors.

Hence, in accordance with this invention, the photodiode 17 "sees" only a very small central portion of the LED scan spot 15. The image of the photodiode slit 20 constitutes the actual scanning spot. The resulting system, therefore, does not have the decoding errors which would be inherent in using a multi-millimeter sized scan spot, but, instead uses a viewing window whose dimensions, at least as considered along the scan direction, are on the same order of magnitude as those of the bars and spaces of the symbol to be read.

This invention is not intended to be limited to rectangular slits, since other shapes are possible. The shape of the slit determines the depth of focus and the readability of the symbol.

Figure 9:
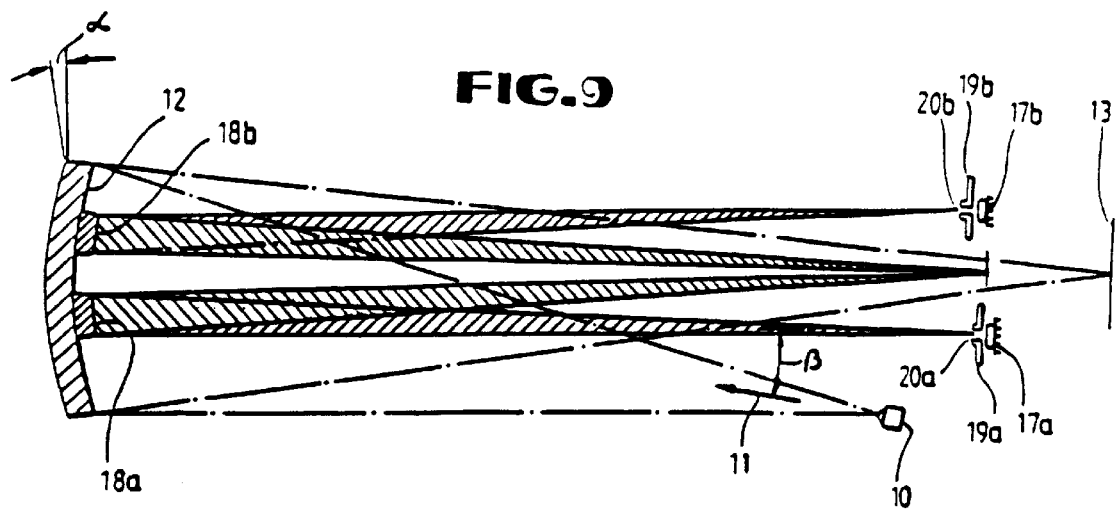
FIG. 9 is an elevation view in diagrammatic form (corresponding to FIG. 1) of another embodiment of a non-laser-based system for reading bar code symbols.
Figure 10:
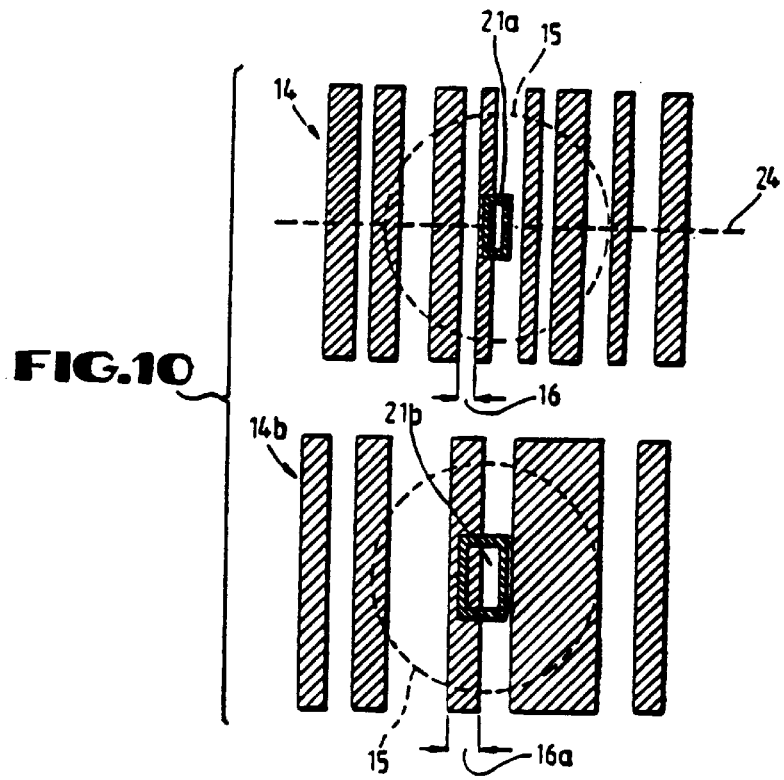
FIG. 10 is an enlarged view of a bar code symbol with two viewing windows and a scan spot (corresponding to FIG. 2) for the embodiment of FIG. 9.

As shown in the alternate embodiment of FIG. 9, rather than relying on a single photodiode, a pair of photodiodes 17a and 17b are provided in the bar code reader, each photodiode and apertured wall has associated with it its own imaging mirror 18a and 18b which, in turn, form a pair of superimposed viewing windows 21a and 21b as seen in FIG. 10. The viewing window 21a is more suited for high density bar code symbols, whereas the viewing window 21b is larger and more suited for low density bar code symbols. The window 21b has a width corresponding to the minimum width of features of the bar code symbol 14b. Alternatively, the viewing windows 21a and 21b may be in different viewing planes 22, offset from each other as well as from the scan plane 13; thus, symbols at different distances from the reader unit may be brought into sharp focus, thereby extending the working range.

FIGS. 11 and 12 depict a currently preferred commercial embodiment of a scanner head in accordance with the present invention. The scanning components are contained within a casing 62 which is preferably of light-weight plastic, yet is sturdy enough to withstand the rigors of normal use. All major components may be mounted on a printed circuit board 64. These major components comprise a light-emitting diode 66, a photodetector 68, a scanning assembly 70, as well as the various electronic and other components to provide the scanning of symbols as described herein.

The scanning assembly 70 includes a coil 72, a magnet 74, a motor support frame 76, a pair of leaf springs 78, preferably of Mylar, a smaller mirror 80, and a larger mirror 82. The light from the LED 66 follows an axis 84 and reflected light returning to the scanner from a symbol to the photodetector follows an axis 86. As before, the angle between the axes 84 and 86 is $\beta$, preferably about 8°, for example. Light from the LED 66, reflected by the larger mirror 82, leaves and returns to the scanner in a scan plane 88. The angle r between the axis 84 and the scan plane 88 is preferably about 7.5° to 8°, for example. As shown in FIG. 12, the LED is tilted up slightly to provide this angle, in combination with the arrangement of the larger mirror 82.

To scan a symbol, the coil 72 is pulsed with electrical power a plurality of times a second to provide on the order of 40 scans per second, for example. When the coil 72 is energized, it attracts the magnet 74, which is attached to a mirror support frame 90. The mirror support frame 90 supports the mirrors 80 and 82. Attracting the magnet 74 into the coil 72 pivots the mirror support frame 90 and the mirrors 80 and 82 about a pivot 92. This pivoting action creates torsion stress in the leaf springs 78 and, when the coil is de-energized, the leaf springs restore the mirror support frame and the mirrors to their quiescent position. Pulsing the coil 72 with an electrical pulse train coordinated with the restorative strength of the leaf springs 78 provides a smooth, even scan of the desired frequency and scan width.

As shown in FIGS. 11 and 12, the scanner of the present invention requires no trigger as in known scanners. The scanner preferably employs the motion sensor as described with regard to FIG. 8 which detects when the user picks up the hand-held unit, and turns on the light source and the source of the electrical pulse train to the coil 72 in response to this detection. The pulse train and light source can then be turned off by a time-out circuit, or in response to decoding a valid bar code. The motion sensor also may sense when the user moves the scanner to a next bar code and thereby initiate a scan.

Figure 13:
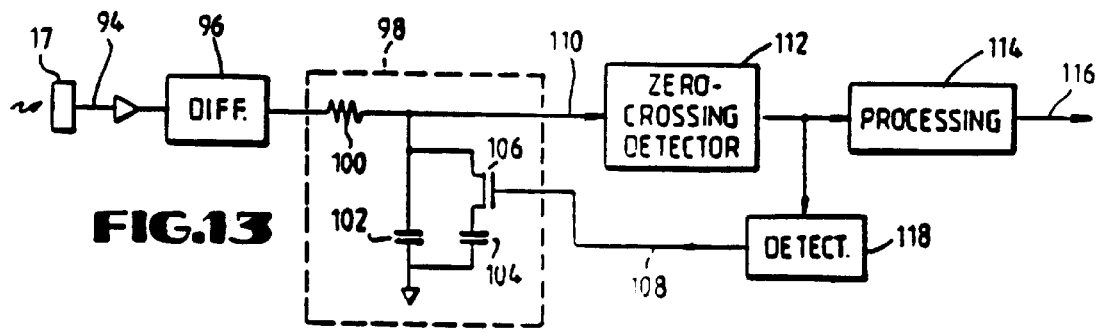
FIG. 13 is an electrical circuit diagram in schematic form of a digitizer circuit that may be used in the system of FIGS. 1–5 according to an embodiment of the invention.

Referring to FIG. 13, the sensor 17 is connected to circuitry for processing the electrical signals produced as a result of the bar code scan. This digitizer circuitry may be of the same general type disclosed in U.S. patent application Ser. No. 440,510, filed Nov. 22, 1989, or other such digitizing circuitry as set forth in the above-identified patents; for example, such signal processing circuitry can be of the type described and claimed in U.S. Pat. No. 4,360,798, incorporated herein by reference. However, according to one feature of a preferred embodiment, an automatic bandwidth control is added. The analog signal produced by the sensor 17 on line 94 is applied to a differential circuit 96 which produces an output that is the first derivative of the analog signal. The frequency content or bandwidth of the analog signal or the first derivative signal is dependant upon the type of bar code symbol 14 being scanned. A high density bar code 14 produces a higher frequency of transitions between black and white and so the signal has more peaks and valleys, or the first derivative has more zero-crossings. The output of the differential circuit 96 is applied to a low-pass filter 98 which has a resistor 100 and a capacitor 102 connected across the differentiator output. The cut-off frequency of this filter is dependant upon the value of the capacitor in series with the resistor, and so in order to switch this cut-off frequency (and thus switch the bandwidth to which the digitizing circuitry responds) and additional capacitor 104 is in parallel with the capacitor 102 and a switch 106 provided to remove this capacitor 104 from the filter circuit. When a voltage exceeding the threshold voltage of the FET switch 106 is applied to a line 108, the switch completes the circuit to place the capacitor 104 in parallel with the capacitor 102 and thus lowers the cutoff frequency (narrows the bandwidth), but if a zero voltage is applied by the line 108 to the gate of the FET switch then the capacitor 104 is removed and the cut-off frequency is higher (bandwidth is wider). The output 110 from the filter is applied to a zero-crossing detector 112, producing an output. This signal, again, will have a higher frequency content when the bar code density is higher, since the number of zero-crossings per unit time is higher. The output of the zero-crossing detector 112 is coupled to further processing circuitry 114 of conventional type, producing a digitized electrical signal at output 116, and this signal is either sent to the terminal unit by the cable 31, or further processed to recognize and recover bar code data in the housing 25 itself. In addition, however, the output signal of the zero-crossing detector 112 is applied to a detector 118 (e.g., an integrator circuit and an invertor) to produce a voltage on the line 108 back to the FET switch 106 that is high for low density bar codes and zero for high density bar codes. In this manner, the capacitor 104 is switched out of the circuit when scanning high density bar codes, making the bandwidth of the filter wider, or the capacitor 104 is left in the filter when scanning low density bar codes, making the bandwidth narrower. Thus, due to the narrower bandwidth, noise is removed from the processing circuitry for low density bar code scanning, making it more likely to obtain a valid bar code recognition.

Alternatively, the bandwidth switching circuitry can be responsive to the output of the bar code recognition arrangement, i.e., downstream of the processor 114. The bar code signals produced at the output 116 are usually examined to see if a valid bar code is being read. A bar code can be recognized or distinguished from noise or from text printed on the package by various methods, or combinations of methods. For example, the number of transitions per unit of scan, or the ratio of black to white per unit of scan, can indicate that the pattern being scanned is most likely a bar code rather than text or other figures. Also, or in addition, a look-up table of valid bar code patterns may be maintained in memory and compared with the bar code signals on the output 116. This recognition can be used to select broad or narrow bandwidth, based on identifying the actual type of bar code (high density or low density) being scanned, or failure to recognize a bar code in one scan can result in the bandwidth being switched to see if a valid code is recognized in subsequent scans.

It will be understood that each of the elements described above, or two or more together, also may find a useful application in other types of constructions differing from the types described above.

While the invention has been illustrated and described as embodied in a light emitting diode scanner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for the various applications without omitting features that, from the standpoint of prior art, fairly constitute essential characteristics of the generic or specific aspects of this invention and, therefore, such adaptations should be and are intended to be comprehended within the meaning and range of equivalence of the following claims.

What is claimed as new and desired to be protected by Letters Patent is set forth in the appended claims.

We claim:

1. A method of operating a bar code scanner comprising the steps of:
   (a) directing a light beam at a bar code symbol;
   (b) scanning said light beam across said bar code symbol;
   (c) detecting light reflected from said bar code symbol and generating an electrical signal in response thereto;
   (d) passing said electrical signal through a low-pass filter with selectable bandwidth;
   (e) determining a density of said bar code symbol as represented by said electrical signal and producing a control signal based on that determination; and
   (f) selecting the bandwidth of said low-pass filter based on said control signal.

2. A method according to claim 1 herein said low-pass filter has a capacitance of selectable value said selectable capacitance being used to select said bandwidth of said low-pass filter.

3. A method according to claim 1 wherein a lower bandwidth is selected when said density of said bar code symbol as represented by said electrical signal is low.

4. A method according to claim 1 wherein a higher bandwidth is selected when said density of said bar code symbol as represented by said electrical signal is high.

5. A method according to claim 1 wherein said light beam is generated by a solid state diode.

6. A method according to claim 1 wherein said step of selecting the bandwidth includes selecting a high bandwidth in response to a value of said control signal corresponding to a high density of transitions in said bar code symbol, and selecting a low bandwidth in response to a value of said control signal corresponding to a low density of transitions in said bar code symbol.

7. A method of operating a bar code scanner comprising the steps of:
   (a) directing a light beam at a bar code symbol;
   (b) scanning said light beam across said bar code symbol;
   (c) detecting light reflected from said bar code symbol and generating an electrical signal in response thereto; and
   (d) passing said electrical signal through a low-pass filter with selectable bandwidth, wherein a lower bandwidth is selected when a density of said bar code symbol as represented by said electrical signal is low.

8. A method of operating a bar code scanner comprising the steps of:
   (a) directing a light beam at a bar code symbol;
   (b) scanning said light beam across said bar code symbol;
   (c) detecting light reflected from said bar code symbol and generating an electrical signal in response thereto; and
   (d) passing said electrical signal through a low-pass filter with selectable bandwidth, wherein a higher bandwidth is selected when a density of said bar code symbol as represented by said electrical signal is high.

9. An arrangement for use in a scanning system such as a bar code reader, comprising:
   (a) a photodetector for sensing the intensity of light reflected by the bar code symbol and generating an analog bar code signal representative thereof;
   (b) a signal processing circuit for producing a processed signal representing the first derivative of the analog bar code signal;
   (c) a digitizer circuit receiving said processed signal as an input and generating a digitized signal corresponding to transitions in the analog signal which are representative of transitions in the spatially-separated, light reflective portions of the bar code symbol;

(d) a process circuit having as an input said processed signal for making a determination of a characteristic of said processed signal and whether or not a fixed threshold is exceeded by such characteristic and including (i) a subcircuit for establishing a threshold level, and (ii) a subcircuit including a capacitor and resistor for establishing a timed interval, such process circuit producing an attenuation signal at a certain time depending upon the threshold level and the determined characteristic of the bar code signal; and (e) a discriminating circuit responsive to said attenuation signal for discriminating transitions in the analog signal so as to change state from a first pass-band state to a signal that could be associated with a bar code to be transmitted, and changing state to an attenuation state only upon the detection of a sequence of transitions in the signal which could not be associated with the transitions represented by a bar code symbol.

10. A circuit as defined in claim 9, wherein the determined characteristic of the bar code symbol is its density.

11. A circuit as defined in claim 10, wherein noise is at least partially removed for low density bar code scanning.

12. A circuit as defined in claim 10, wherein noise is at least partially removed for bar codes wherein the determined characteristic is a low frequency of transitions of black and white as detected by the photodetector.

13. A circuit as defined in claim 9, wherein the determined characteristic of the bar code the symbol is the frequency of transitions of black and white as detected by the photodetector in format of transitions per unit of scan.

14. A circuit as defined in claim 9, wherein the transitions in the analog signal not associated with a valid bar code are from noise or from text printed in the package.

15. A circuit as defined in claim 9, wherein the subcircuit including a capacitor and resistor further includes a FET switch, wherein a predetermined voltage is applied to the gate terminal of said FET switch to close that switch or make it conductive to change state to said attenuation state and zero voltage is applied to the switch gate terminal to create the first pass-band state.

16. A circuit as defined in claim 15, wherein the subcircuit including a capacitor and resistor lowers the frequency at which the attenuation signal is produced when a predetermined voltage is applied to the gate terminal of the FET.

17. A method of reading a bar code symbol, comprising the steps of (a) scanning a light beam across a bar code symbol, detecting light reflected from said bar code symbol, and generating an electrical signal representative of said bar code symbol;

(b) processing said electrical signal by filtering said signal using a first bandwidth if said bar code symbol is of a first density or filtering said signal using a second bandwidth if said bar code symbol is of a second density.

18. A method according to claim 17, including the step of generating from said electrical signal, a control signal responsive to said density of said bar code and using said control signal to select the bandwidth of said processing.

19. A method according to claim 18 wherein said step of processing includes subjecting said electrical signal to a filter having a variable capacitor, and varying said capacitor in response to said control signal to select between said first and said second bandwidths.

20. A method according to claim 17 wherein said step of scanning includes generating a light beam from a light emitting diode and passing said light beam through an oscillating mirror.

21. A method according to claim 20 wherein said step of scanning includes moving a field of view for a light detector across said bar code symbol.

22. A bar code scanner comprising:

(a) a light beam generator and scanner for scanning a light beam spot across a bar code symbol;

(b) a detector responsive to light reflected from said bar code symbol which generates an electrical signal in response thereto;

(c) a circuit receiving said electrical signal and generating bar code data therefrom, said circuit having a low pass filter for which the frequency cut off is automatically selectable in response to the density of said bar code symbol.

23. A scanner according to claim 22 wherein said filter has a capacitance of selectable value to thereby select said frequency cut off of said circuit.

24. A scanner according to claim 22 wherein said frequency cut off is changed to a lower frequency when said density is low.

25. A scanner according to claim 22 wherein said frequency cut off is changed to a higher frequency when said density is high.

26. A scanner according to claim 22 wherein said bar code symbol includes bars and spaces, and said circuit includes means for detecting transitions in said electrical signal resulting from light reflected from said bars and spaces to thereby generate a control signal related to said density.

27. A scanner according to claim 26 wherein said circuit includes means responsive to said control signal to select said frequency cut off.

28. A method of reading a bar code symbol comprising the steps of:

(a) scanning a light beam across a bar code symbol, detecting light reflected from said bar code symbol and generating an electrical signal representative of the bar code symbol;

(b) processing said electrical signal by filtering said signal using a first bandwidth during the initial scan;

(c) determining the density of said bar code symbol from said initial scan;

(d) processing said bar code symbol with a second bandwidth in subsequent scans if said bar code symbol is determined to be a low density symbol; and (e) generating an electrical signal representative of said bar code symbol.

29. The method of claim 28 wherein the density of said bar code symbol is determined by detecting the transitions from white and black and determining the number of transitions per unit of scan.

30. A method of reading a bar code symbol, comprising the steps of scanning a light beam across a bar code symbol;

detecting light reflected from the bar code symbol;

filtering said electrical signal using a bandwidth determined by a characteristic of said bar code symbol.

31. A method of reading a bar code symbol as in claim 30, where said characteristic is a density of said bar code symbol.

32. A bar code scanner comprising:

a light beam generator and scanner for scanning a light beam spot across a bar code symbol;

a detector responsive to light reflected from said bar code symbol, which generates a corresponding electrical signal; and a circuit receiving said electrical signal and genrating bar code data therefrom, said circuit having a filter for which the frequency cut off is automatically selectable in response to a characteristic of said bar code symbol.

33. A bar code scanner as in claim 32, where said characteristic is a density of said bar code symbol.

34. A bar code scanner as in claim 32, where said filter is a low pass filter.

35. A method of reading a bar codes symbol comprising the steps of:

scanning a light beam across a bar code symbol;

detecting light reflected from said bar code symbol;

generating an electrical signal representative of said bar code symbol;

processing said electrical signal during an initial scan by filtering said signal using a first bandwidth;

determining a characteristic of said bar code symbol from said initial scan; and processing said bar code symbol with a second bandwidth in subsequent scans if said characteristic is below a threshold.

36. A method of reading a bar code symbol as in claim 35, where said characteristic is a density of said bar code symbol.

37. A method of operating a bar code scanner comprising the steps of:

directing a light beam at a bar code symbol;

scanning said light beam across said bar code symbol;

detecting light reflected from said bar code symbol;

generating an electrical signal in response thereto;

passing said electrical signal through a low-pass filter of selectable bandwidth;

determining a characteristic of said bar code symbol as represented by said electrical signal;

producing a control signal based on that determination; and selecting the bandwidth of said low-pass filter based on said control signal.

\* \* \* \* \*

UNITED STATES PATENT AND TRADEMARK OFFICE
CERTIFICATE OF CORRECTION

PATENT NO. : 5,828,050
DATED : October 27, 1998
INVENTOR(S) : Edward BARKAN

It is certified that error appears in the above-identified patent and that said Letters Patent is hereby corrected as shown below:

On the title page, item [54] and Column 1;
In the Title, change "LIGHT EMITTING LASER DIODE SCANNER" to --BAR CODE SCANNER WITH ADJUSTABLE BANDWIDTH--.

Under field [60] entitled Related U.S. Application Data, at line 3, change "5,410,140" to --5,410,139--.

At column 1, line 8, change "5,410,140" to --5,410,139--; at line 22, change "08/055,878" to --08/056,878--.

Signed and Sealed this

Twenty-first Day of September, 1999

Attest:

Q. TODD DICKINSON

*Attesting Officer*  *Acting Commissioner of Patents and Trademarks*